(12) United States Patent
Gamble et al.

(10) Patent No.: US 10,479,496 B2
(45) Date of Patent: Nov. 19, 2019

(54) MAGNETIC ORIENTATION DETENT WITH MOTOR ASSIST

(71) Applicant: Lockheed Martin Corporation, Bethesda, MD (US)

(72) Inventors: Dustin Eli Gamble, San Luis Obispo, CA (US); Gordon Jennings, San Luis Obispo, CA (US); Justin Neel, Santa Margarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 412 days.

(21) Appl. No.: 15/338,832

(22) Filed: Oct. 31, 2016

(65) Prior Publication Data

US 2018/0118335 A1    May 3, 2018

(51) Int. Cl.
| | |
|---|---|
| *B64C 29/00* | (2006.01) |
| *H02K 11/21* | (2016.01) |
| *H02K 11/33* | (2016.01) |
| *H02K 7/00* | (2006.01) |
| *H02K 7/02* | (2006.01) |
| *H02K 7/14* | (2006.01) |
| *H02P 3/02* | (2006.01) |
| *B64C 27/30* | (2006.01) |

(52) U.S. Cl.
CPC .......... *B64C 29/0025* (2013.01); *B64C 27/30* (2013.01); *H02K 7/003* (2013.01); *H02K 7/02* (2013.01); *H02K 7/14* (2013.01); *H02K 11/21* (2016.01); *H02K 11/33* (2016.01); *H02P 3/025* (2013.01)

(58) Field of Classification Search
CPC ..... B64C 27/30; B64C 27/56; B64C 29/0025; B64C 13/04; B64C 13/10; G05G 5/06; H02K 11/21; H02K 11/33
See application file for complete search history.

(56) References Cited

U.S. PATENT DOCUMENTS

| | | | |
|---|---|---|---|
| 2,959,373 A | 11/1960 | Zuck | |
| 3,693,911 A | 9/1972 | Bacon | |
| 5,337,030 A | 8/1994 | Mohler | |
| (Continued) | | | |

FOREIGN PATENT DOCUMENTS

| | | |
|---|---|---|
| CN | 205524941 | 8/2016 |
| EP | 3 2005 577 A1 | 2/2017 |
| (Continued) | | |

OTHER PUBLICATIONS

EPO Communication and extended European search report re Application No. 17194874.8-1010, dated Feb. 16, 2018.
(Continued)

*Primary Examiner* — Justin M Benedik
(74) *Attorney, Agent, or Firm* — Baker Botts L.L.P.

(57) ABSTRACT

In one embodiment, a magnetic orientation detent includes a motor coupled to a motor shaft, the motor mechanically coupled to a motor mount. The magnetic orientation detent may also include a flywheel mechanically coupled to a distal end of the motor shaft. The magnetic orientation detent may further include a first plurality of magnets coupled to the motor mount and a second plurality of magnets coupled to the flywheel. The second plurality of magnets couple magnetically to the first plurality of magnets.

17 Claims, 7 Drawing Sheets

(56) References Cited

U.S. PATENT DOCUMENTS

| | | | |
|---|---|---|---|
| 5,454,530 A * | 10/1995 | Rutherford | B64C 27/24 244/22 |
| 6,293,491 B1 | 9/2001 | Wobben | |
| 6,669,137 B1 | 12/2003 | Chen | |
| 7,589,608 B2 | 9/2009 | Decker | |
| 8,584,983 B2 | 11/2013 | Sirohi | |
| 8,690,096 B2 * | 4/2014 | Alvarez Calderon F. | B64C 3/10 244/17.11 |
| 9,199,733 B2 | 12/2015 | Keennon | |
| 9,334,049 B1 * | 5/2016 | LeGrand, III | B64C 27/473 |
| 2002/0125977 A1 | 9/2002 | VanZoest | |
| 2006/0060708 A1 * | 3/2006 | Decker | B64C 1/1407 244/129.5 |
| 2007/0109082 A1 * | 5/2007 | Potter | H02K 7/106 335/22 |
| 2009/0306829 A1 * | 12/2009 | Hildebrand | B64C 11/008 700/279 |
| 2009/0314562 A1 * | 12/2009 | Soderberg | B64C 25/36 180/65.51 |
| 2012/0207598 A1 | 8/2012 | Eyraud | |
| 2013/0251525 A1 * | 9/2013 | Saiz | B64C 27/26 416/23 |
| 2013/0300242 A1 | 11/2013 | Yamada | |
| 2014/0346283 A1 * | 11/2014 | Salyer | B64C 37/00 244/7 A |
| 2016/0280364 A1 | 9/2016 | Korhonen | |

FOREIGN PATENT DOCUMENTS

| | | |
|---|---|---|
| WO | WO 2013/066477 A2 | 5/2013 |
| WO | WO 2013/066477 A3 | 5/2013 |
| WO | WO 2014/021798 A2 | 2/2014 |
| WO | WO 2014/021798 A3 | 2/2014 |
| WO | WO 2014/032032 A1 | 2/2014 |

OTHER PUBLICATIONS

U.S. Appl. No. 15/040,428, filed Feb. 10, 2016, Dustin Eli Gamble.
EP Communication, extended European Patent Search, regarding Application. No. 17155672.3-1754, dated May 10, 2017.
USPTO First Office Action; U.S. Appl. No. 15/040,428, dated Sep. 7, 2017.
Response to first Office Action; U.S. Appl. No. 15/040,428, dated Jan. 8, 2018.
EP Communication pursuant to Article 94(3) EPC, regarding Application. No. 17 194 874.8-1010, dated Feb. 25, 2019.

* cited by examiner

MAGNETIC ORIENTATION DETENT WITH MOTOR ASSIST

TECHNICAL FIELD

This disclosure generally relates to aircraft operation and, more specifically, to a magnetic orientation detent with motor assist.

BACKGROUND

Fixed-wing aircraft perform a number of commercial, military, and civilian tasks. Once airborne, fixed-wing aircraft are power efficient and effective at cruising for long distances. Yet, fixed-wing aircraft typically require sufficient runway space for takeoff and landing. Recently, hybrid aircraft have incorporated a multirotor system with the fixed-wing aircraft. The multirotor system allows the hybrid aircraft to take off and land vertically, while the fixed-wing system is used for flying once airborne. However, once airborne, the multirotor system may interfere with the flying capabilities of the fixed-wing aircraft.

SUMMARY OF PARTICULAR EMBODIMENTS

In one embodiment, a hybrid aircraft includes a fixed-wing propulsion system and a multirotor propulsion system. The multirotor propulsion system includes a propeller coupled to a first distal end of a motor shaft. The motor shaft is drivable using a motor. The multirotor propulsion system may also include a motor mount mechanically coupled to the motor, the motor mount coupling the motor to the multirotor propulsion system. The multirotor propulsion system may further include a flywheel mechanically coupled to a second distal end of the motor shaft. The hybrid aircraft may include a magnetic orientation detent having a first plurality of magnets coupled to the motor mount and a second plurality of magnets coupled to the flywheel.

In an example embodiment, a method for applying a magnetic orientation detent includes flying a hybrid aircraft using a multirotor propulsion system and a fixed-wing system. The multirotor propulsion system includes a propeller coupled to a first distal end of a motor shaft, a motor coupled to the multirotor propulsion system using a motor mount, the motor operable to drive the motor shaft, and a flywheel mechanically coupled to a second distal end of the motor shaft. The method may further include removing power from the motor of the multirotor propulsion system, and locking the propeller of the multirotor propulsion system using a magnetic orientation detent. The magnetic orientation detent may include a first plurality of magnets mechanically coupled to the motor mount and a second plurality of magnets mechanically coupled to the flywheel. The first and second plurality of magnets may magnetically couple when power is removed from the multirotor propulsion system.

Technical advantages of certain embodiments may include increasing the aerodynamic attributes of a hybrid aircraft by reducing drag. Holding the propellers of the multirotor system in line with the airflow of the hybrid aircraft may prevent the propellers from freely spinning during flight, which can cause excess wear on the motor bearings and generate excessive noise. Another advantage provided by the magnetic orientation detent with motor assist may include extending the flight-time capabilities of the hybrid aircraft by minimizing the power consumption of the multirotor propulsion system when flying with the fixed-wing propulsion system. Another advantage provided by a magnetic orientation detent with motor assist is that it may reduce the number of mechanical components of the hybrid aircraft, thereby decreasing the number of components subject to failure and reducing the weight of the hybrid aircraft.

Other technical advantages will be readily apparent to one skilled in the art from FIGS. 1-6, descriptions, and claims. Moreover, while specific advantages have been enumerated above, various embodiments may include all, some, or none of the enumerated advantages.

DETAILED DESCRIPTION OF EXAMPLE EMBODIMENTS

Figure 1:
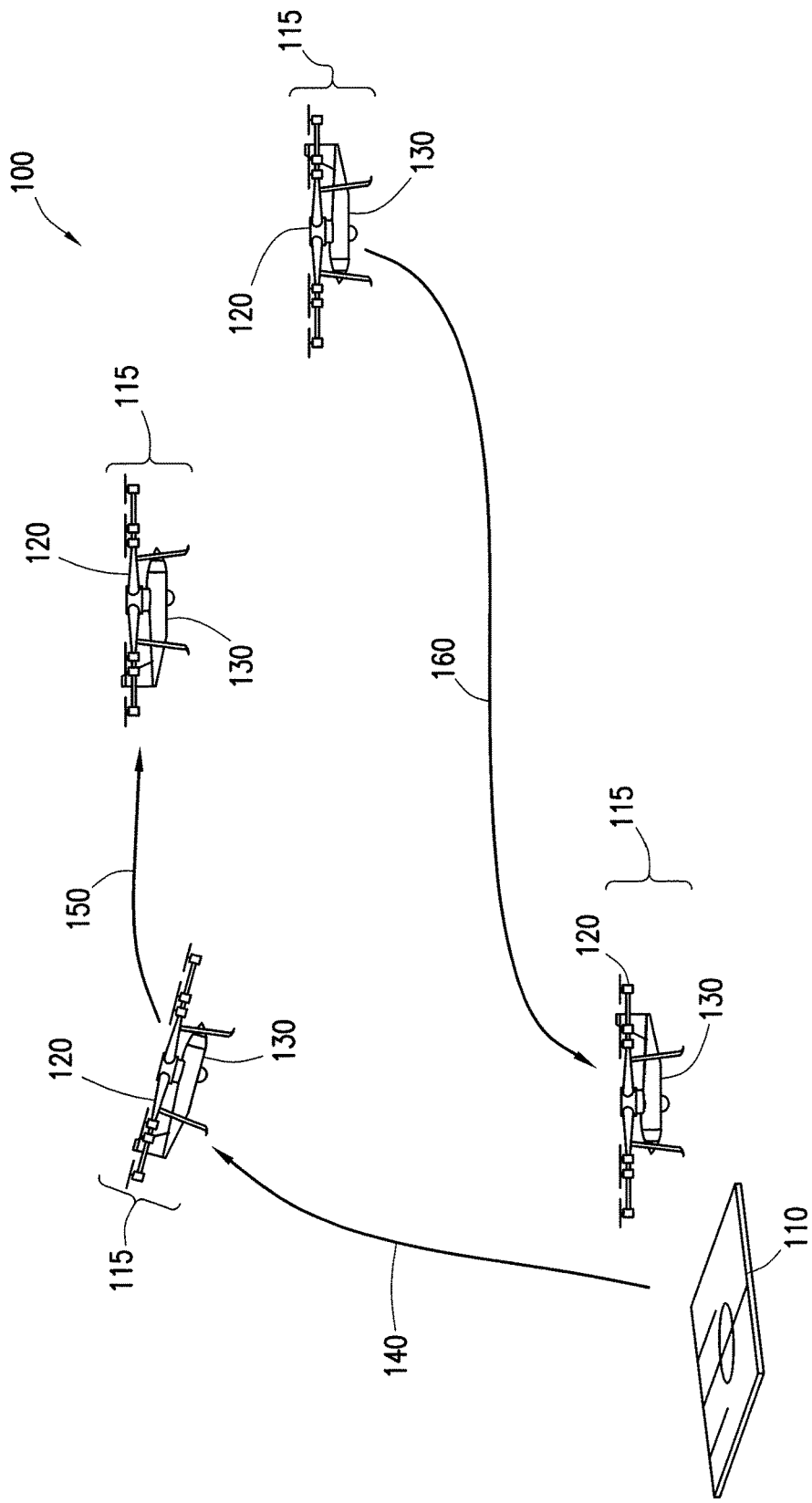
FIG. 1 illustrates an example system of a hybrid aircraft launching and landing, according to certain embodiments.

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 6, where like numbers are used to indicate like and corresponding parts.

Fixed-wing aircraft perform a number of commercial, military, and civilian tasks. Once airborne, fixed-wing aircraft are power efficient and effective at cruising for long distances. Yet, fixed-wing aircraft typically require sufficient runway space for takeoff and landing. Recently, hybrid aircraft have incorporated a multirotor system with the fixed-wing aircraft. The multirotor system allows the hybrid aircraft to take off and land vertically, while the fixed-wing system is used for flying once airborne. However, once airborne the multirotor system may interfere with the flying capabilities of the fixed-wing aircraft.

For example, a hybrid aircraft may utilize a multirotor propulsion system to vertically launch and accelerate to a cruising speed. Once the hybrid aircraft reaches a sufficient airspeed for flight using a more efficient fixed-wing propulsion system, the hybrid aircraft may switch power from the multirotor propulsion system to the fixed-wing propulsion system. Once the hybrid aircraft is flying with the fixed-wing system, power to the multirotor system may be removed. However, once power is removed, the propellers from the multirotor system may windmill and spin freely while the hybrid aircraft is flying. This extraneous movement by the propellers may increase drag on the hybrid aircraft, impeding the efficiency and flying performance of the hybrid aircraft. Furthermore, the free spinning propellers may cause excess wear on the motor bearings used to drive the propellers, reducing the life of the multirotor system.

Several techniques have attempted to overcome the issues presented by the free spinning propellers of the multirotor system. For example, some hybrid devices continuously apply power to the multirotor system to keep the propellers in a locked position. However, this approach may consume excessive battery power, thus reducing the available flight time of the hybrid aircraft.

To utilize the benefits of the multirotor system while minimizing interference with the fixed-wing system, embodiments of the disclosure may include a magnetic orientation detent with motor assist to hold the propellers of the multirotor system in place when the propellers of the multirotor system are not being utilized. To apply a magnetic orientation detent with motor assist according to embodiments of the disclosure, a first plurality of magnets may be coupled to each motor mount of the multirotor system. Each propeller of the multirotor system may be coupled to a flywheel via the drive shaft of the motor. The flywheel may comprise a second plurality of magnets that may magnetically couple with the first plurality of magnets.

When power is removed from the multirotor system, the magnetic forces between the flywheel magnets and the magnets coupled motor mount may attract to hold the motor shaft in place. In certain embodiments, after power is removed from the motor, the drive shaft may not come to rest in the "locked" position (i.e., where the flywheel magnets align with the motor mount magnets and magnetically couple). To align the magnets, the motor may apply a locking drive scheme that causes the motor to gently rotate the motor shaft. For example, the locking drive scheme may cause the motor to rotate the motor shaft with a lower torque than is required to overcome the magnetic coupling strength between the magnets. This locking drive scheme results in the motor shaft rotating until the flywheel magnets are aligned with the motor mount magnets in the "locked" position.

By properly selecting the polarity, positioning, and strength of the magnets, the propeller may be oriented and held in line with the flight of the hybrid aircraft. When power is re-applied to the multirotor system, the force from the motor may overcome the magnetic detent and drive the propellers.

Applying a magnetic orientation detent with motor assist to the propellers of the multirotor system provides a number of technical advantages not realized by current systems. Certain embodiments may increase the aerodynamic attributes of a hybrid aircraft by reducing drag. Holding the propellers of the multirotor system in line with the airflow of the hybrid aircraft may prevent the propellers from freely spinning during flight, which can cause excess wear on the motor bearings and generate excessive noise. Another advantage provided by the magnetic orientation detent with motor assist may include extending the flight-time capabilities of the hybrid aircraft by minimizing the power consumption of the multirotor propulsion system when flying with the fixed-wing propulsion system. Another advantage provided by a magnetic orientation detent with motor assist is that it may reduce the number of mechanical components of the hybrid aircraft, thereby decreasing the number of components subject to failure and reducing the weight of the hybrid aircraft. FIGS. 1-6 provide additional details of the magnetic orientation detent with motor assist that may provide these and other advantages.

FIG. 1 illustrates an example system 100 of a hybrid aircraft 115 launching and landing according to certain embodiments. In the illustrated embodiment, hybrid aircraft 115 comprises a multirotor system 120 and a fixed-wing system 130. Hybrid aircraft 115 may take-off and land from a launch site 110.

Launch site 110 represents any suitable location that allows hybrid aircraft 115 to takeoff and/or land. In some embodiments, launch site 110 may represent an area that cannot accommodate a runway. For example, launch site 110 may be a helipad on a ship, a rooftop of a building, uneven terrain, a heavily populated event, or any other suitable location that allows hybrid aircraft 115 to takeoff and/or land.

To take off from launch site 110, hybrid aircraft 115 powers multirotor system 120 to vertically lift and elevate hybrid aircraft 115 along a launch path 140. A number of factors may determine the elevation and direction of launch path 140. These factors may include the flight path and mission of hybrid aircraft 115, the surrounding environmental conditions (e.g., nearby buildings, fences, etc.), regulations (e.g., Federal Aviation Regulations or local ordinances), wind and weather patterns, and design limitations of hybrid aircraft 115 (e.g., battery capacity, wingspan, etc.). Launch path 140 may also vary based on the capabilities of multirotor system 120 such as the rate of elevation and lifting capacity.

In an example embodiment, hybrid aircraft 115 may takeoff vertically from launch site 110 using multirotor system 120. Hybrid aircraft 115 may climb to a release altitude of 1000 feet at a rate of 500 feet-per-minute (fpm). The elevation and climbing rate of hybrid aircraft 115 may depend on the application and technical specifications of hybrid aircraft 115.

In some embodiments, upon reaching the desired altitude, hybrid aircraft 115 may transition to a forward direction according to a flight path 150. In some embodiments, multirotor system 120 may elevate at an angle during launch path 140 in the direction of flight path 150. Multirotor system 120 may continue accelerating along flight path 150 until reaching a sufficient speed to switch flight responsibility to fixed-wing system 130.

Depending on the size and abilities of fixed-wing system 130, multirotor system 120 may accelerate to any suitable speed that allows fixed-wing system 130 to maintain flight after power to multirotor system 120 is reduced or shut off. For example, hybrid aircraft 115 may be utilized to dispense pesticides as an agricultural crop duster. When crop dusting, hybrid aircraft 115 may fly at 30-40 km/h. Thus, hybrid aircraft 115 may accelerate up to 30-40 km/h using multirotor system 120 and then switch power to fixed-wing system 130 to perform the crop dusting.

As another example, hybrid aircraft 115 may be used for reconnaissance missions and need to cover long distances at a higher cruising speed. Hybrid aircraft 115 may utilize multirotor system 120 to take-off and accelerate up to minimum airspeed sufficient for fixed-wing system 130 to operate independently. Upon reaching a sufficient airspeed, hybrid aircraft 115 may switch power over to fixed-wing system 130.

In some embodiments, hybrid aircraft 115 may utilize both multirotor system 120 and fixed-wing system 130 to enhance the acceleration of hybrid aircraft 115. This may decrease the time needed to accelerate to the desired switchover speed and may ensure that fixed-wing system 130 is operating at sufficient speeds to maintain flight once power to multirotor system 120 is removed.

In this manner, hybrid aircraft 115 may takeoff vertically and accelerate using multirotor system 120. Hybrid aircraft 115 may then switch over to fixed-wing system 130 to conserve power and increase flying efficiency.

As shown in detail in FIGS. 2, 3, 4A, and 4B, once power to multirotor system 120 is shutoff and hybrid aircraft 115 is flying using fixed-wing system 130, the propellers of multirotor system 120 (e.g., propellers 122) may begin spinning freely. This may increase the drag on hybrid aircraft 115, thereby reducing the flying efficiency of fixed-wing system 130. Furthermore, the free spinning propellers may cause excess wear on the motor bearings of the propellers, as well as generate noise.

To overcome these issues, the propellers of multirotor system 120 may be held in line with the direction hybrid aircraft 115 is flying. In some embodiments, the propellers of multirotor system 120 are locked in place using a magnetic orientation detent with motor assist as described in detail in FIGS. 3, 4A, and 4B.

Once hybrid aircraft 115 has finished flying using fixed-wing system 130, hybrid aircraft 115 may return to launch site 110 along a return path 160. While returning to launch site 110, hybrid aircraft 115 may begin to decelerate so that hybrid aircraft 115 may land vertically at launch site 110. For example, hybrid aircraft 115 may reduce power to fixed-wing system 130 so that hybrid aircraft 115 decreases airspeed. Hybrid aircraft 115 may increase power to multirotor system 120 while decreasing power to fixed-wing system 130 until multirotor system 120 is the primary propulsion system. The power provided to multirotor system 120 may be sufficient to overcome the magnetic orientation detent holding propellers 120 in place. In some embodiments, multirotor system 120 may bring hybrid aircraft 115 to a hover and vertically descend onto launch site 110.

In some embodiments, hybrid aircraft 115 may utilize the propulsion systems of both multirotor system 120 and fixed-wing system 130 to aid in the deceleration process. In this manner, multirotor system 120 and fixed-wing system 130 may both return to launch site 110 in a controlled manner.

Modifications, additions, or omissions may be made to system 100 without departing from the scope of the disclosure. In some embodiments, hybrid aircraft 115 may be controlled by a pilot in a remotely located control area. In some embodiments, hybrid aircraft 115 may operate autonomously to take off along launch path 140 and land according to return path 160. For example, hybrid aircraft 115 may follow a preprogrammed launch path 140 and climb to a specific elevation at a specific rate of speed. Hybrid aircraft 115 may then switch to using fixed-wing system 130.

As another example, to maximize the locations where hybrid aircraft 115 may operate, in certain embodiments, hybrid aircraft 115 may include landing gear to utilize runways when available and rely on multirotor system 120 if runways are unavailable. This may be beneficial if hybrid aircraft 115 is launching from a first location having sufficient area for a runway but traveling to a second location that cannot support a runway (or vice versa). Thus, the second location may still rely on and utilize hybrid aircraft 115 based on the vertical landing capabilities of multirotor system 120.

Figure 2:
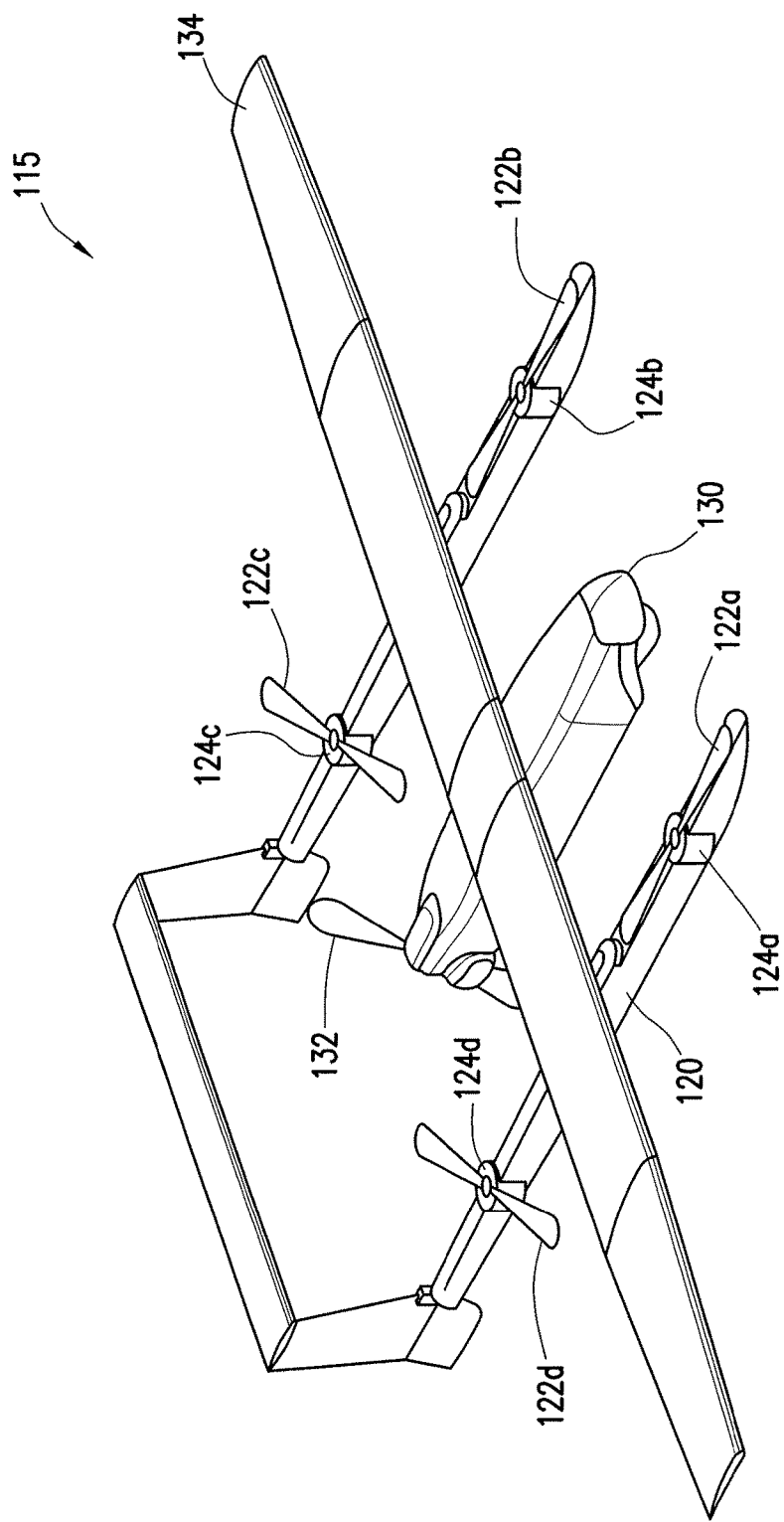
FIG. 2 illustrates an example hybrid aircraft, according to certain embodiments.

FIG. 2 illustrates an example hybrid aircraft 115 according to certain embodiments. In the illustrated embodiment, hybrid aircraft 115 comprises multirotor system 120 and fixed-wing system 130.

Multirotor system 120 represents any suitable device capable of assisting in the takeoff and landing of hybrid aircraft 115. In the illustrated embodiment, multirotor system 120 includes four propellers 122a-d (collectively "propellers 122") driven by motors 124a-d (collectively "motors 124").

Motors 124 represent any suitable motor for driving propellers 122 of multirotor system 120. The size and capability of motors 124 (e.g., power, thrust, rpm, etc.) may depend on the applications of hybrid aircraft 115. Similarly, the power and thrust capabilities of motors 124 may depend on additional factors such as the weight of hybrid aircraft 115, the length and pitch of propellers 122, the desired efficiency of motors 124, any payloads attached to hybrid aircraft 115, and the desired takeoff capabilities (e.g., climb rates) of hybrid aircraft 115. In some embodiments, motors 124 may be brushless DC motors.

Hybrid aircraft 115 may power motors 124 to drive propellers 122 to vertically launch and land hybrid aircraft 115. Furthermore, by varying the power to each individual motor 124, hybrid aircraft 115 may control the direction, speed, pitch, and yaw of hybrid aircraft 115.

In the illustrated embodiment, fixed-wing system 130 includes a fixed-wing propeller 132 and a wing 134. Fixed-wing propeller 132 may be used to propel hybrid aircraft 115. In the illustrated embodiment, fixed-wing propeller 132 is positioned at the rear of hybrid aircraft 115. However, fixed-wing propeller 132 may be positioned at any suitable location, such as on the nose of hybrid aircraft 115. Wing 134 may vary in size and shape depending on the size, weight, and lift needed to fly hybrid aircraft 115.

FIG. 2 also illustrates the "proper" (i.e., locked) and "improper" positioning of propellers 122 when utilizing the magnetic orientation detent with motor assist according to embodiments of the present disclosure. As described above, once hybrid aircraft 115 has reached sufficient airspeed using multirotor system 120, primary power may be switched to fixed-wing system 130. The magnetic orientation detent with motor assist may then hold propellers 122 in-line with the direction hybrid aircraft 115 is flying. In the illustrated embodiment, propellers 122a and 122b are properly aligned in the locked position for streamlined flying. Accordingly, the positioning of propellers 122a and 122b streamline hybrid aircraft 115 as it flies using fixed-wing system 130.

In contrast, propellers 122c and 122d illustrate improperly aligned propellers or propellers that are allowed to freely spin once power has been removed from multirotor system 120. By not aligning with the direction of flight, propellers 122c and 122d cause excess drag on hybrid aircraft 115. Furthermore, the motors of propellers 122c and 122d may wear out the bearings of motor 124c and 124d as propellers 122c and 122d freely spin. This may reduce the useful lifespan of hybrid aircraft 115.

Modifications, additions, or omissions may be made to hybrid aircraft 115 without departing from the scope of the disclosure. For example, the illustrated embodiment shows multirotor system 120 with four propellers 122a-d. However, multirotor system 120 may have any suitable number of propellers 122. Furthermore, in some embodiments, instead of having single propellers 122, multirotor system 120 may include clusters of propellers 122. For example, multirotor system 120 may comprise propeller clusters that have a variable-pitch to control the vertical acceleration and climb rates. In some embodiments, propeller clusters may be fixed-pitch blades that may each be independently controlled to control flight speed and direction. Similarly, although the illustrated embodiment shows fixed-wing system 130 comprising fixed-wing propeller 132, the propulsion mechanism of fixed-wing system 130 may utilize any suitable propulsion mechanism, such as jet engines.

Furthermore, in some embodiments, hybrid aircraft 115 may include landing supports that allow hybrid aircraft 115 to land and/or takeoff from launch site 110 without requiring landing gear. For example, landing supports may be sufficiently long in length to support both multirotor system 120 and fixed-wing system 130 when stationary on launch site 110.

Figure 3:
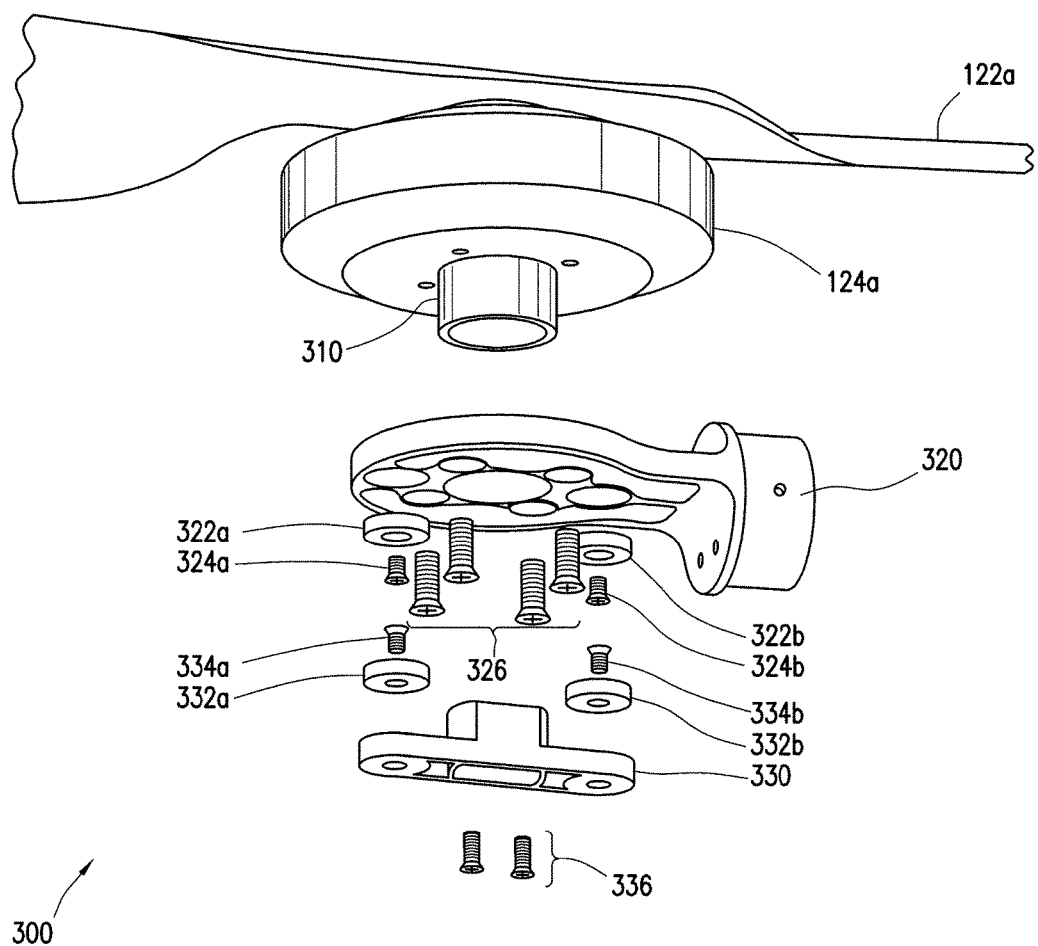
FIG. 3 illustrates an exploded view of an example magnetic orientation detent with motor assist used to lock the propellers of a multirotor system, according to certain embodiments.
Figure 4A:
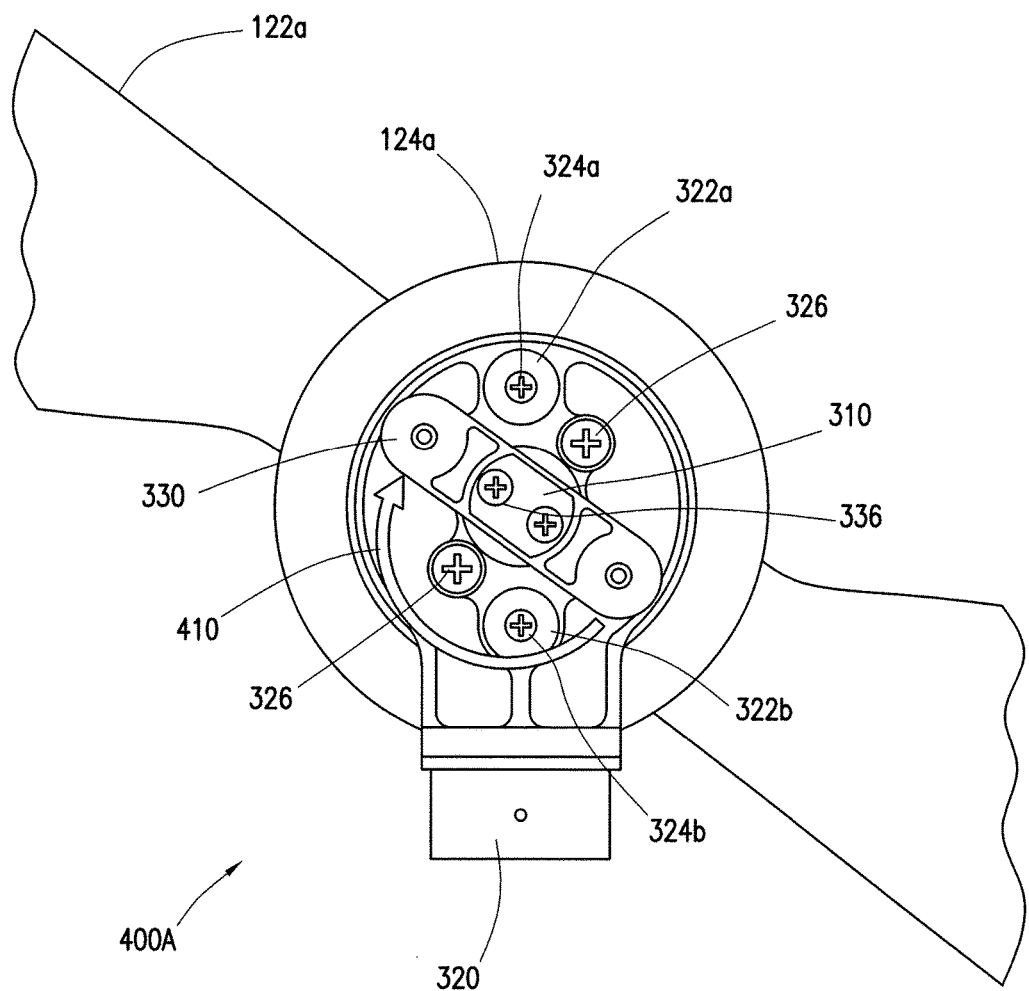
FIG. 4A illustrates an underneath view of an example multirotor system applying motor assist, according to certain embodiments.
Figure 4B:
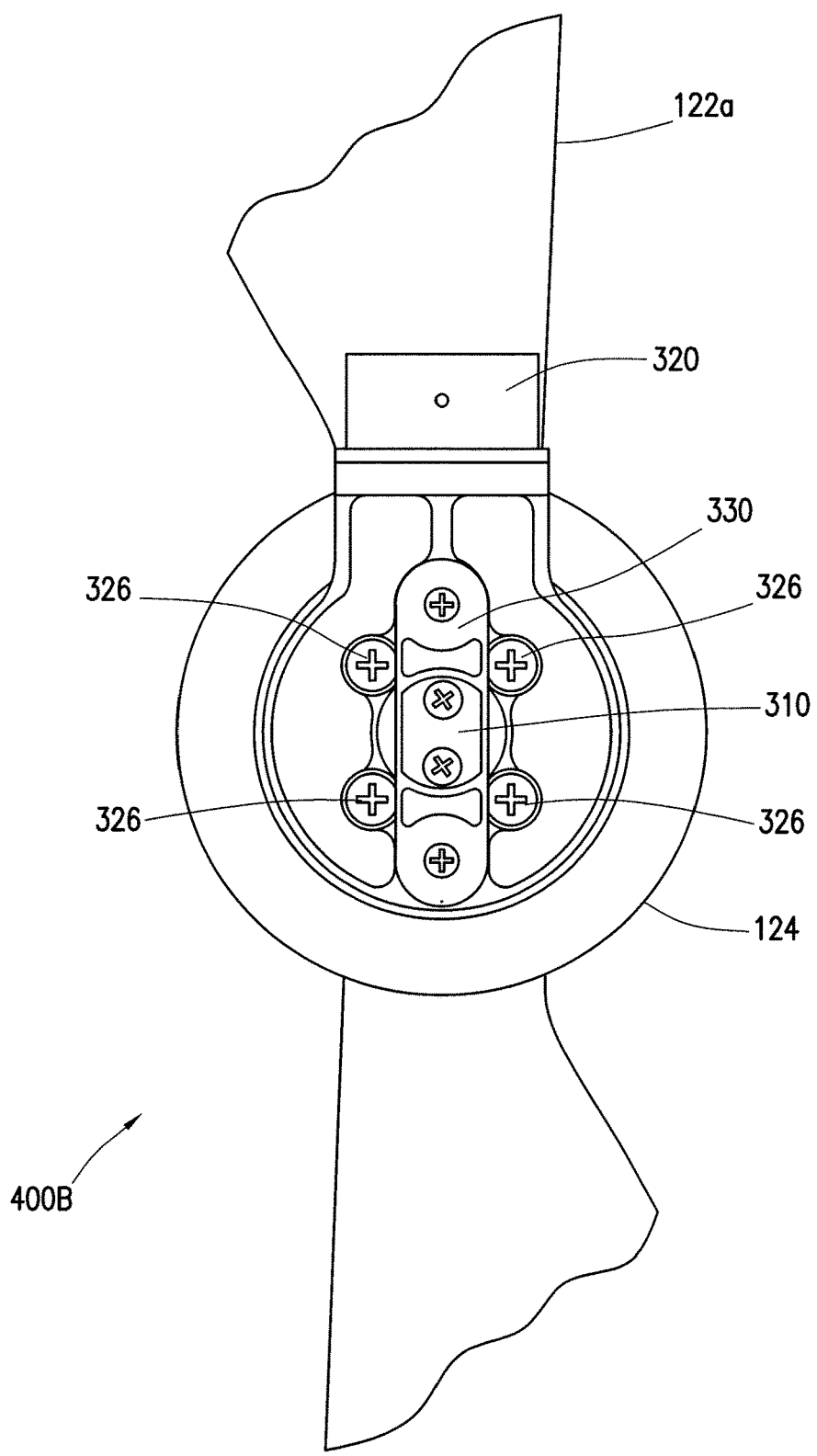
FIG. 4B illustrates an underneath view of an example magnetic orientation detent with motor assist with propellers of a multirotor system in a locked position.

To provide a better understanding of the magnetic orientation detent with motor assist of hybrid aircraft 115, FIGS. 3, 4A, and 4B illustrate exploded and close-up views of the propulsion system of multirotor system 120 according to certain embodiments.

FIG. 3 illustrates an exploded view 300 of an example magnetic orientation detent with motor assist used to lock propellers 122 of multirotor system 120, according to certain embodiments. In the illustrated embodiment, motor 124a drives propeller 122a using motor shaft 310. Motor 124a and propeller 122a may be coupled to multirotor system 120 using motor mount 320. For example, motor mount fasteners 326 may mechanically couple motor mount 320 to motor 124a. Motor shaft 310 may extend through motor mount 320 and couple to flywheel 330. In some embodiments, flywheel 330 may be mechanically coupled to motor shaft 310 using flywheel fasteners 336.

In the illustrated embodiment, the magnetic orientation detent with motor assist is applied to multirotor system 120 using motor mount magnets 322a-b (collectively "motor mount magnets 322") and flywheel magnets 332a-b (collectively "flywheel magnets 332"). Motor mount magnets 322 may be mechanically coupled to motor mount 320 using motor magnet fasteners 324a-b, while flywheel magnets 332 may be mechanically coupled to flywheel 330 using flywheel magnetic fasteners 334a-b.

Motor magnet fasteners 324 and flywheel magnetic fasteners 334 represent any suitable mechanism that allows motor mount magnets 322 to be coupled to motor mount 320 and flywheel magnets 332 to be coupled to flywheel 330, respectively. In the illustrated embodiments, motor magnet fasteners 324 and flywheel magnetic fasteners 334 are illustrated using screws. The screws may be sized relative to the size of motor mount magnets 322 and flywheel magnets 332. In some embodiments, motor magnet fasteners 324 and flywheel magnetic fasteners 334 may utilize other coupling mechanisms such as glue, epoxy, and/or welding. In certain embodiments, motor magnet fasteners 324 and flywheel magnetic fasteners 334 may be built into motor mount 320 and flywheel 330.

Motor mount magnets 322 may be aligned in parallel to flywheel magnets 332. In this manner, motor 124a may drive propeller 122a when powered by hybrid aircraft 115. However, when power is removed from motor 124a, the magnetic attraction between motor mount magnets 322 and flywheel magnets 332 may attract and become magnetically coupled. Once magnetically coupled, motor shaft 310 is held in place, thereby preventing propeller 122a from freely spinning.

Motor mount magnets 322 and flywheel magnets 332 represent any suitable magnets that are capable of providing a magnetic orientation detent to propeller 122a. Furthermore, motor mount magnets 322 and flywheel magnets 332 may be any suitable shape, size, strength, and material. Factors that influence the design of motor mount magnets 322 and flywheel magnets 332 may include the operational temperature range required by the magnetic orientation detent, the required oxidation resistivity, susceptibility to demagnetization, mechanical strength, and magnetic field strength.

Motor mount magnets 322 and flywheel magnets 332 may be made of any suitable material. As an example, and not by way of limitation, motor mount magnets 322 and flywheel magnets 332 may be comprised of neodymium iron boron (NdFeB), samarium cobalt (SmCo), alnico, and/or ceramic or ferrite magnets.

The polarity and/or magnetic orientation of motor mount magnets 322 and flywheel magnets 332 may be selected in any suitable fashion that allows motor mount magnets 322 magnetically couple with flywheel magnets 332 to hold propellers 122 in place when power to multirotor system 120 is removed. Motor mount magnets 322 may be the same shape and size as flywheel magnets 332 and have the same or varying magnetic properties.

For instance, motor mount magnets 322 and flywheel magnets 332 may be shaped as washers, disks, or any other suitable shape. In some embodiments, the polarity of motor mount magnets 322 may be oriented such that the downward facing side is a first polarity (e.g., North) and the upward facing side (i.e., the side facing motor 124) is the second, opposite polarity (e.g., South). The polarity of flywheel magnets 332 may be oriented such that the upward facing side is the second polarity (South) and the downward facing side (i.e., the side facing away from motor 124) is the first polarity (North). Thus, the facing poles of motor mount magnets 322 and flywheel magnets 332 are opposite. In this manner, motor mount magnets 322 will attract and magnetically couple to flywheel magnets 332.

In the illustrated embodiment, the two positions per revolution of motor shaft 310 that cause motor mount magnets 322 to align with flywheel magnets 332 represent the two "locked" positions. These locked positions result in propeller 122a aligning with the body of multirotor device 120, thereby causing hybrid aircraft 115 to become more aerodynamic than when propellers 122 are freely spinning.

To better understand the relationship between motor shaft 310, motor mount magnets 322, flywheel magnets 332, and the motor assist feature of the present disclosure FIGS. 4A and 4B illustrate underneath views 400A and 400B of an example multirotor system applying motor assist to the magnetic orientation detent, according to certain embodiments.

FIG. 4A illustrates an underneath view 400A of multirotor system 120 applying motor assist, according to certain embodiments.

During operation, motor 124a may be powered off, causing motor shaft 310 to coast to a stop. Motor shaft 310 may or may not come to a rest in a locked position (i.e., when motor mount magnets 322 align with flywheel magnets 332 causing propellers 122 to lock in-line with the body of multirotor device 120). When motor shaft 310 does not come to a rest in a locked position, a locking drive scheme may be applied to motor 124a. The locking drive scheme may rotate motor shaft 310, as indicated by arrow 410, causing flywheel magnets 332 to become aligned with motor mount magnets 322. The locking drive scheme may be implemented such that motor 124 drives motor shaft 310 with a lower torque than is required to overcome the magnetic strength of motor mount magnets 322 and flywheel magnets 332.

The electronic speed control implemented by the locking drive scheme may generate a low speed stepped waveform applied to motor 124a, which slowly rotates motor shaft 310 until motor mount magnets 322 and flywheel magnets 332 align and magnetically couple. Motor 124a may apply a drive torque that is high enough to overcome the friction in multirotor system 120 and aerodynamic loads on propeller 122a, but low enough to allow the rotation of motor shaft 310 to stop once motor mount magnets 322 and flywheel magnets 332 align and magnetically couple.

In an example embodiment, when implementing the locking drive scheme the duty cycle of the stepped waveform that controls the torque delivered by motor 124a may be determined based on the power supply voltage of hybrid aircraft 115. For example, to create a constant motor torque, the power supply voltage may be measured and used to calculate the duty cycle of the stepped waveform. In this manner, the locking drive scheme may ensure that a constant torque is applied by motor 124a, independent of the batter charge state.

In some embodiments, the position of motor shaft 310, and thus flywheel 330, may be determined using an encoder to determine the position of motor shaft 310. If the encoder determines that, based on the position of motor shaft 310, motor mount magnets 322 are in a locked position with flywheel magnets 332, no locking drive scheme may be applied to motors 124. In this manner, the locking drive scheme may be applied to each individual motor 124a-d as needed. For example, if propellers 122a-c come to a rest in the locked position after power is removed from each motor 124, the locking drive scheme may only be applied to motor 124d to bring propeller 122d into the locked position. Moreover, should a propeller 122 come out of the locked position (e.g., due to turbulence) an encoder may sense the changed position of motor shaft 310 and implement the locking drive scheme to return propeller 122 to the locked position.

In some embodiments, the locking drive scheme may always be applied to motors 124. For example, the locking drive scheme may simply be applied to each motor 124 after power has been removed from motors 124. Since the force applied by the locking drive scheme is lower than the torque required to overcome the magnetic strength of motor mount magnets 322 and flywheel magnets 332, propellers 122 that are already in the locked position will not be rotated out of the locked position. This may ensure that each propeller 122a-d is in a locked position after power is removed from multirotor system 120.

FIG. 4B illustrates an underneath view 400B of the magnetic orientation detent with motor assist with propellers 122 of a multirotor system 120 in a locked position, according to certain embodiments.

After the locking drive scheme is applied to motor 124 causing motor shaft 310 to rotate and align motor mount magnets 322 with flywheel magnets 332, propeller 122 may be rotated to the locked position. Once in the locked position, the magnetic orientation detent created by motor mount magnets 322 and flywheel magnets 332 will prevent propellers 122 from freely spinning as hybrid aircraft 115 is propelled using fixed-wing system 130.

Modifications, additions, or omissions may be made to hybrid aircraft 115 without departing from the scope of the disclosure. For example, although FIGS. 3, 4A, and 4B are illustrated using propeller 122a and motor 124a, each propeller 122 in multirotor system 120 may incorporate the illustrated magnetic orientation detent with motor assist.

Figure 5:
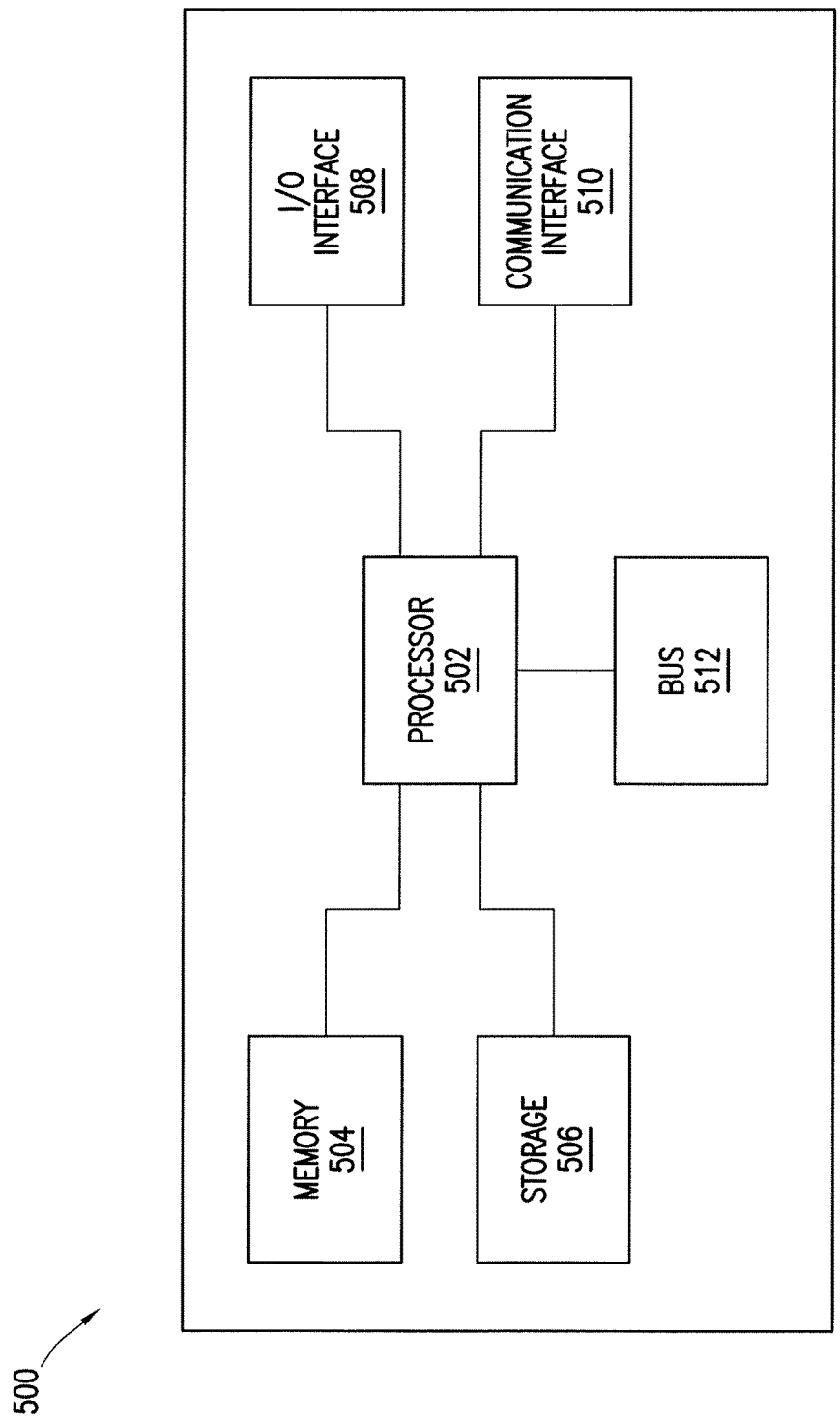
FIG. 5 illustrates an example computer system used to operate a hybrid aircraft, according to certain embodiments.

FIG. 5 illustrates an example computer system 500 used to operate hybrid aircraft 115, according to certain embodiments. For example, in some embodiments, computer system 500 may control the power allocation between multirotor system 120 and fixed-wing system 130. Moreover, computer system 500 may implement the locking drive scheme communicated to motors 124. In some embodiments, computer system 500 may communicate with one or more encoders coupled with motors 124.

One or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 408, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data.

The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 406. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a video camera, speaker, infrared sensor, another suitable I/O device, or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network.

This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis (e.g., within the body of fixed-wing system 130) and control the operations of hybrid aircraft 115. In some embodiments, the components of computer system 500 may be separated into multirotor system 120 and fixed-wing system 130. The operations of computer system 500 may be performed by more, fewer, or other components. Additionally, operations of computer system 500 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 6:
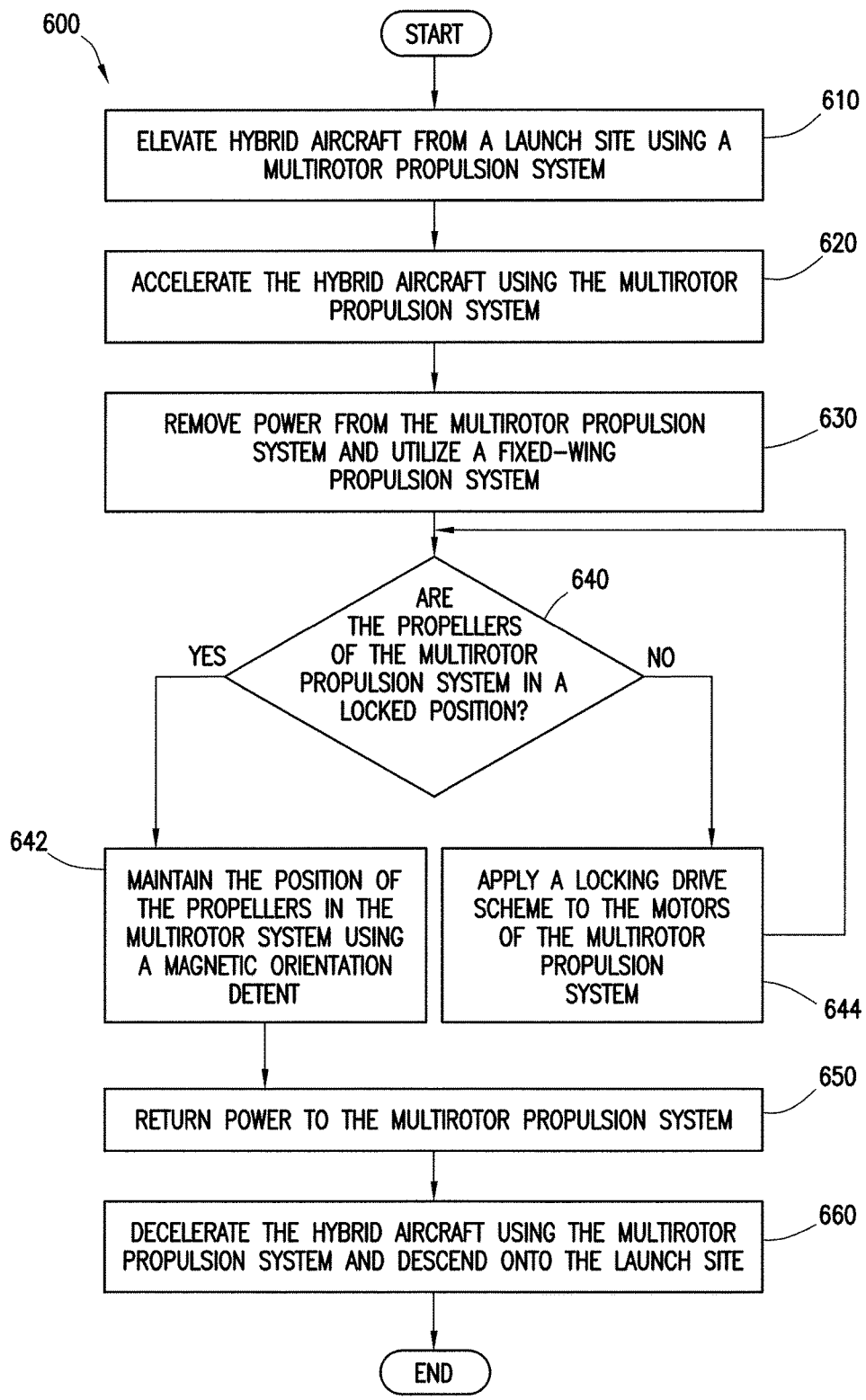
FIG. 6 illustrates an example method for implementing a magnetic orientation detent with motor assist, according to certain embodiments.

FIG. 6 illustrates an example method 600 for operating hybrid aircraft 115 having a magnetic orientation detent with motor assist, according to certain embodiments. At step 610, hybrid aircraft 115 may takeoff from launch site 110 using multirotor system 120. Multirotor system 120 may elevate hybrid aircraft 115 from launch site 110 vertically using one or more propellers 122. Multirotor system 120 may elevate hybrid aircraft 115 to a desired elevation and/or airspeed. For example, in some embodiments, multirotor system 120 initiates the elevation process upon receiving a launch signal from an operator stationed at a location separate from launch site 110. Upon receiving the launch signal, multirotor system 120 may follow launch path 140 up to a desired elevation.

At step 420, multirotor system 120 may accelerate hybrid aircraft 115 up to a sufficient airspeed to allow fixed-wing system 130 to take over flight of hybrid aircraft 115. The airspeed needed before switching over to fixed-wing system 130 may depend on a number of factors including the weight of hybrid aircraft 115, the altitude, and the vertical and lateral acceleration of hybrid aircraft 115. In some embodiments, the minimum airspeed needed by hybrid aircraft 115 before switching from multirotor system 120 to fixed-wing system 130 may at least be the stall speed of hybrid aircraft 115. In certain embodiments, fixed-wing system 130 may utilize its own propulsion system to assist multirotor system 120 in the acceleration process before power is removed from multirotor system 120.

At step 630, computer system 500 may remove power from multirotor system 120 and utilize fixed-wing system 130. Once power is removed from multirotor system 120, propellers 122 of multirotor device 120 may coast to a stop. In some situations, motor mount magnets 322 and flywheel magnets 332 may cause propellers 122 to come to a rest in the locked position. In some situations, one or more propellers may not come to a rest in the locked position.

At step 640, computer system 500 determines whether propellers 122 of multirotor system 120 are in a locked position. If propellers 122 of multirotor system 120 are in a locked position, the sequence may proceed to step 642. If propellers 122 of multirotor system 120 are not in a locked position, the sequence may proceed to step 644.

In some embodiments, an encoder may communicate with computer system 500 to determine whether propellers 122 are in the locked position. For example, the encoder may determine the position of motor shaft 310. Motor shaft 310 will be in one of two positions when motor mount magnets 322 are aligned with flywheel magnets 332. When motor shaft 310 is in one of these two positions, the encoder may determine that propellers 122 are in the locked position. However, if motor shaft 310 is not in one of these two positions, the encoder may determine that the propellers are not in a locked position.

At step 644, computer system 500 may apply a locking drive scheme to motors 124 of multirotor system 120. The locking drive scheme may be applied such that motor 124 drives motor shaft 310 with a lower torque than is required to overcome the magnetic attraction between motor mount magnets 322 and flywheel magnets 332. In this manner, propellers 122 that are not in the locked position may be gently rotated to engage the magnetic detent created by motor mount magnets 322 and flywheel magnets 332.

After implementing locking drive scheme, the sequence may return to step 640 to make a further determination of whether propellers 122 are in a locked position.

At step 642, the magnetic orientation detent created by motor mount magnets 322 and flywheel magnets 332 may hold propellers 122 in line with the flight direction of hybrid aircraft 115. For example, as computer system 500 removes power from motor 124a, motor shaft 310 slows its rotation. As motor shaft 310 comes to a stop, flywheel 330 will also come to a stop. As flywheel 330 comes to a stop, flywheel magnets 332 will pass by motor mount magnets 322. In some embodiments, motor mount magnets 322 will attract flywheel magnets 332, causing flywheel 330 to stop with motor mount magnets 322 aligned with flywheel magnets 332. This results in propeller 122 stopping in the locked position. The magnetic orientation detent created by motor mount magnets 322 and flywheel magnets 332 may also prevent propellers 122 from coming out of the locked position during flight of hybrid aircraft 115.

At step 650, computer system 500 may return power to multirotor system 120. The power applied to motors 124 may be sufficient to overcome the magnetic orientation detent created by motor mount magnets 322 and flywheel magnets 332 and drive propellers 122. In some embodiments, hybrid aircraft 115 may return power to multirotor system 120 upon approaching launch site 110 to vertically land hybrid aircraft 115. For example, while returning to launch site 110, hybrid aircraft 115 may increase the power to multirotor system 120 so that both fixed-wing system 130 and multirotor system 120 are utilized in flying hybrid aircraft 115.

At step 660, hybrid aircraft 115 may decelerate until hybrid aircraft 115 is just utilizing multirotor system 120. In some embodiments, hybrid aircraft 115 may decelerate to a hover and descend to launch site 110. In this manner, hybrid aircraft 115 may utilize the flying efficiency created by fixed-wing system 130 even when launch site 110 does not have sufficient room for a runway.

Various embodiments may perform some, all, or none of the steps described above. Furthermore, certain embodiments may perform these steps in a different order or in parallel. Moreover, one or more steps may be repeated. For example, in some embodiments, step 644 may always be performed after step 640. Thus, in some embodiments the locking drive scheme may always be applied to motors 124 to ensure that propellers 122 are in the locked position. Moreover, in some embodiments step 640 may not be performed, for example, motors 123 do not include an encoder. If step 640 is not performed, the locking drive scheme of step 644 may replace step 640 before proceeding to step 642. Any suitable component may perform one or more steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A aircraft, comprising:
a fixed-wing propulsion system;
a multirotor propulsion system, the multirotor propulsion system comprising:
a propeller coupled to a first distal end of a motor shaft, the motor shaft drivable using a motor;
a motor mount mechanically coupled to the motor, the motor mount coupling the motor to the multirotor propulsion system;
a flywheel mechanically coupled to a second distal end of the motor shaft; and
a magnetic orientation detent, the magnetic orientation detent comprising:
a first plurality of magnets coupled to the motor mount; and
a second plurality of magnets coupled to the flywheel; and
further comprising a processor, the processor operable to execute a locking drive scheme, wherein the locking drive scheme causes the motor to drive the motor shaft to rotate with a torque having a force less than the force needed to overcome magnetic coupling of the first and second plurality of magnets and lock the propeller in line with a flight direction of the aircraft.

2. The aircraft of claim 1, wherein:
the first plurality of magnets coupled to the motor mount comprise a first magnet and a second magnet, the first and second magnets having a first magnetic polarity oriented in towards the second plurality of magnets; and
the second plurality of magnets coupled to the flywheel comprise a third magnet and a fourth magnet, the third and fourth magnets having a second magnetic polarity oriented towards the first plurality of magnets, wherein the second magnetic polarity is opposite that of the first magnetic polarity.

3. The aircraft of claim 1, further comprising:
an encoder coupled to the motor, the encoder operable to determine a locked position of the motor shaft, wherein the locked position corresponds to a position of the motor shaft when the first and second plurality of magnets are aligned and magnetically coupled.

4. The aircraft of claim 1, wherein the torque is determined by a duty cycle applied to the motor, the duty cycle calculated based on a power supply voltage of the aircraft.

5. The aircraft of claim 3, wherein the locking drive scheme is applied to the motor in response to the encoder determining that the motor shaft is not in the locked position.

6. The aircraft of claim 1, wherein the first and second plurality of magnets are comprised of Neodymium-Iron-Boron.

7. A method for applying a magnetic orientation detent, the method comprising:
flying a aircraft using a multirotor propulsion system and a fixed-wing system, the multirotor propulsion system comprising:
a propeller coupled to a first distal end of a motor shaft;
a motor coupled to the multirotor propulsion system using a motor mount, the motor operable to drive the motor shaft; and
a flywheel mechanically coupled to a second distal end of the motor shaft;
removing power from the motor of the multirotor propulsion system;
locking the propeller of the multirotor propulsion system using a magnetic orientation detent, the magnetic orientation detent comprising:
a first plurality of magnets mechanically coupled to the motor mount; and
a second plurality of magnets mechanically coupled to the flywheel; and
wherein the first and second plurality of magnets magnetically couple when power is removed from the multirotor propulsion stem; and
wherein locking the propeller comprises locking the propeller in line with a flight direction of the aircraft.

8. The method of claim 7, further comprising:
applying a locking drive scheme to the motor of the multirotor device, wherein upon applying the locking drive scheme the motor rotates the motor shaft with a torque having a force less than the force needed to overcome the magnetic coupling of the first and second plurality of magnets.

9. The method of claim 8, further comprising:
determining, using an encoder coupled to the motor, a position of the motor shaft; and
applying the locking drive scheme to the motor in response to the position of the motor shaft indicating that the first and second plurality of magnets are not magnetically coupled.

10. The method of claim 8, wherein the torque is determined by a duty cycle applied to the motor, the duty cycle calculated based on a power supply voltage of the aircraft.

11. The method of claim 7, further comprising:
powering the multirotor propulsion system, wherein in response powering the multirotor propulsion system, the motor shaft overcomes the magnetic coupling created by the first and second plurality of magnets.

12. The method of claim 7, wherein the first and second plurality of magnets are comprised of Neodymium-Iron-Boron.

13. A magnetic orientation detent, comprising:
a motor coupled to a motor shaft;
a motor mount, the motor mechanically coupled to the motor mount;
a flywheel mechanically coupled to a distal end of the motor shaft;
a first plurality of magnets coupled to the motor mount;
a second plurality of magnets coupled to the flywheel, the second plurality of magnets are coupled magnetically to the first plurality of magnets;

further comprising a processor, the processor programmable to implement a locking the drive scheme, wherein the locking drive scheme causes the motor to drive the motor shaft to rotate with a torque having a force less than the force needed to overcome the magnetic coupling of the first and second plurality of magnets; and
wherein the locking drive mechanism locks a propeller associated with the magnetic orientation detent in line with a flight direction of an aircraft.

14. The magnetic orientation detent of claim 13, further comprising:
an encoder coupled to the motor, the encoder operable to determine a locked position of the motor shaft, wherein the locked position corresponds to a position of the motor shaft when the first and second plurality of magnets are aligned.

15. The magnetic orientation detent of claim 14, where the locking drive scheme is applied to the motor in response to the encoder determining that the motor shaft is not in the locked position.

16. The magnetic orientation detent of claim 13, wherein the first and second plurality of magnets are comprised of Neodymium-Iron-Boron.

17. The magnetic orientation detent of claim 13, wherein the flywheel is coupled to the distal end of the motor shaft below the motor mount.

* * * * *